United States Patent
Chan et al.

(10) Patent No.: US 8,631,311 B1
(45) Date of Patent: Jan. 14, 2014

(54) DATA RECOVERY USING EXISTING RECONFIGURABLE READ CHANNEL HARDWARE

(75) Inventors: Kai Keung Chan, Fremont, CA (US); Yu Kou, San Jose, CA (US); Xin-Ning Song, San Jose, CA (US); Wing Hui, San Jose, CA (US)

(73) Assignee: SK hynix memory solutions inc., San Jose, CA (US)

( * ) Notice: Subject to any disclaimer, the term of this patent is extended or adjusted under 35 U.S.C. 154(b) by 91 days.

(21) Appl. No.: 13/453,729

(22) Filed: Apr. 23, 2012

Related U.S. Application Data

(60) Provisional application No. 61/477,973, filed on Apr. 21, 2011.

(51) Int. Cl.
*G06F 11/00* (2006.01)
(52) U.S. Cl.
USPC .......................................... 714/799; 714/769
(58) Field of Classification Search
USPC ............ 360/31, 32, 77.04; 341/118; 714/718, 714/771, 799, 769
See application file for complete search history.

(56) References Cited

U.S. PATENT DOCUMENTS

| | | | | |
|---|---|---|---|---|
| 6,119,261 A | * | 9/2000 | Dang et al. | 714/769 |
| 6,181,493 B1 | * | 1/2001 | Wakefield | 360/31 |
| 7,196,644 B1 | * | 3/2007 | Anderson et al. | 341/118 |
| 2008/0001797 A1 | * | 1/2008 | Aziz et al. | 341/118 |
| 2008/0276156 A1 | | 11/2008 | Gunnam et al. | |
| 2008/0301521 A1 | | 12/2008 | Gunnam et al. | |
| 2012/0200954 A1 | * | 8/2012 | Jin et al. | 360/77.04 |
| 2012/0212849 A1 | * | 8/2012 | Xu et al. | 360/32 |

* cited by examiner

*Primary Examiner* — David Ton
(74) *Attorney, Agent, or Firm* — Van Pelt, Yi & James LLP

(57) ABSTRACT

A method for recovering data is disclosed. A sensed analog signal is converted into digital samples using an analog-to-digital converter (ADC). The digital samples are processed into processed digital samples using a first filter. The processed digital samples are decoded into decoded data. Whether the decoded data is acceptable is then determined. The processed digital samples are fed back to the first filter using a reprocessing circuit such that the processed digital samples are reprocessed into reprocessed digital samples in the event that the decoded data is unacceptable. A set of reprocessing coefficients is provided for the first filter to reprocess the processed digital samples.

20 Claims, 4 Drawing Sheets

DATA RECOVERY USING EXISTING RECONFIGURABLE READ CHANNEL HARDWARE

CROSS REFERENCE TO OTHER APPLICATIONS

This application claims priority to U.S. Provisional Patent Application No. 61/477,973 entitled DATA RECOVERY USING EXISTING RECONFIGURABLE READ CHANNEL HARDWARE filed Apr. 21, 2011 which is incorporated herein by reference for all purposes.

BACKGROUND OF THE INVENTION

An error-correcting code (ECC) decoder has limited error-correcting capability. While the probability of an ECC decoder failing to decode the user data in a receiver system is typically low, it is non-zero. ECC failures may occur under different circumstances: for example, an ECC decoder may fail to decode a data sector due to media defects, servo errors, sub-optimal timing recovery, or sub-optimal equalization. Recovery procedures can be invoked after the ECC decoder returns an uncorrectable status such that the system can be re-trained to properly decode the user data. Therefore, improved techniques for error recovery of a system including an ECC decoder are desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
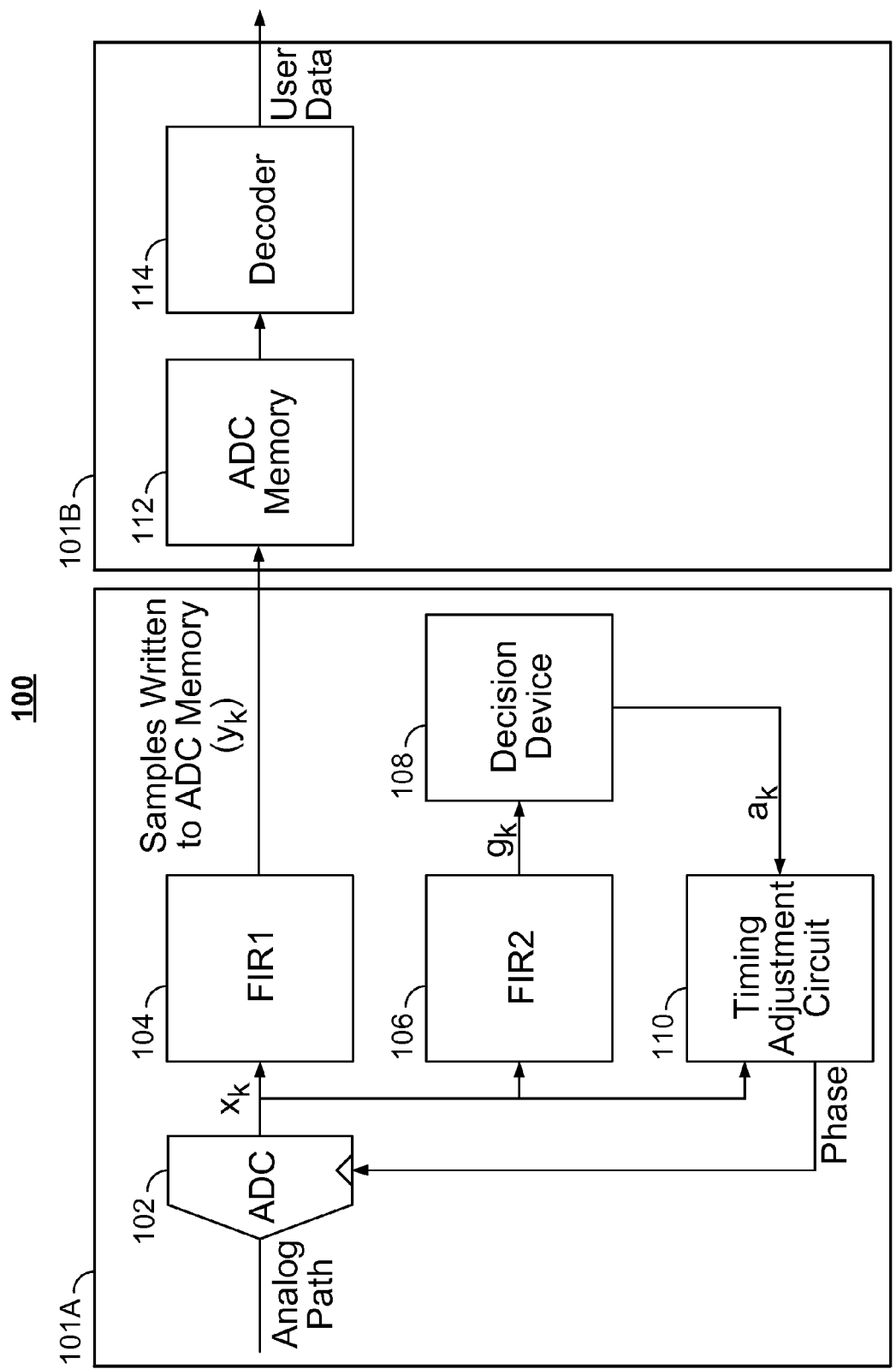
FIG. 1 is a block diagram illustrating an embodiment of a receiver system 100.

FIG. 1 is a block diagram illustrating an embodiment of a receiver system 100. In some embodiments, receiver system 100 is used to read data from storage media (e.g., Flash storage or magnetic disk storage). In some other embodiments, the techniques described herein are used in a communication system and are implemented in a wired or wireless receiver.

Receiver system 100 includes a front end module 101A and a back end module 101B. For example, receiver system 100 may be a read channel 100. Read channel front end module 101A may include modules for equalization, timing recovery, and the like. Read channel back end module 101B may include modules for maximum-likelihood (ML) detection, error-correcting code (ECC) decoding, and the like. In the present patent application, read channels are selected as illustrative examples only. The techniques disclosed herein may apply to other receiver systems as well; accordingly, the present application is not limited to the specific example of read channels only.

With continued reference to FIG. 1, in read channel 100, the hard disk magnetic signal is read by a read head and processed by an analog path. The analog signal from the analog path is then sampled by an analog-to-digital converter (ADC) 102, which converts the analog signal to a discrete time digital representation of the analog signal, $x_k$. The ADC generated digital samples, $x_k$, are equalized by a finite impulse response (FIR) filter, FIR1 filter 104, and the equalized output, $y_k$, is written into an ADC memory block 112. The ADC generated digital samples, $x_k$, are also fed into a second FIR filter, FIR2 filter 106, and the equalized output, $g_k$, is fed to a decision device 108. Decision device 108 outputs bit decisions, $a_k$, which are fed into a timing adjustment circuit 110. Timing adjustment circuit 110 takes the bit decisions, $a_k$, and the ADC generated digital samples, $x_k$, as inputs and generates sampling phase adjustment information for adjusting the sampling phase at ADC 102.

Backend module 101B includes ADC memory block 112 and a decoder module 114. ADC memory block 112 stores the equalized samples, $y_k$, from front end module 101A, and these stored samples are further fed into decoder 114, which decodes the samples into user data. In some embodiments, decoder 114 includes a soft-input soft-output (SISO) equalizer and an ECC decoder. The SISO equalizer provides soft information to the ECC decoder. For example, the SISO equalizer may be implemented using a soft output Viterbi algorithm (SOVA). In other examples, the SISO equalizer is implemented using a Max-Log-MAP algorithm or MAP algorithm. In some embodiments, the ECC decoder is an SISO decoder, such as an LDPC decoder. In various embodiments, the LDPC decoder may be implemented using various algorithms, including the sum-product algorithm, min-sum algorithm, and belief propagation algorithm.

However, an ECC decoder has limited error-correcting capability. The probability of the ECC decoder failing to decode the user data is typically low; however, it is non-zero. One metric used by disk drive companies to assess the robustness of read channels is the sector failure rate (SFR). For example, the SFR of some hard drives is about 1e-8, which translates to one sector failure for every 100 million correctly decoded sectors of data. ECC failures may occur under different circumstances. For example, an ECC decoder may fail to decode a data sector due to media defects, servo errors, sub-optimal timing recovery, or sub-optimal equalization. Recovery procedures can be invoked by read channel 100 after the ECC decoder returns an uncorrectable status such that read channel 100 can be re-trained to properly decode the user data.

The error recovery of read channel 100 may include different procedures for re-training different modules of read channel 100. For example, if decoder 114 fails to decode the user data due to excessive phase errors, then the timing loop may be re-run. In another example, if decoder 114 fails to decode the user data due to sub-optimal equalization, then FIR1 filter 104 may be re-trained with a different set of initial coefficients to equalize the samples to a different target. In some embodiments, the re-running or re-training of the different modules are performed by re-reading sectors of data from the storage media to read channel 100, and the different modules, e.g., the timing recovery module or FIR filters, are re-run or re-trained based on the read data. However, re-reading sectors of data again from the storage media introduces a significant amount of latency to the error recovery procedures, thus affecting the overall performance of read channel 100.

Figure 2:
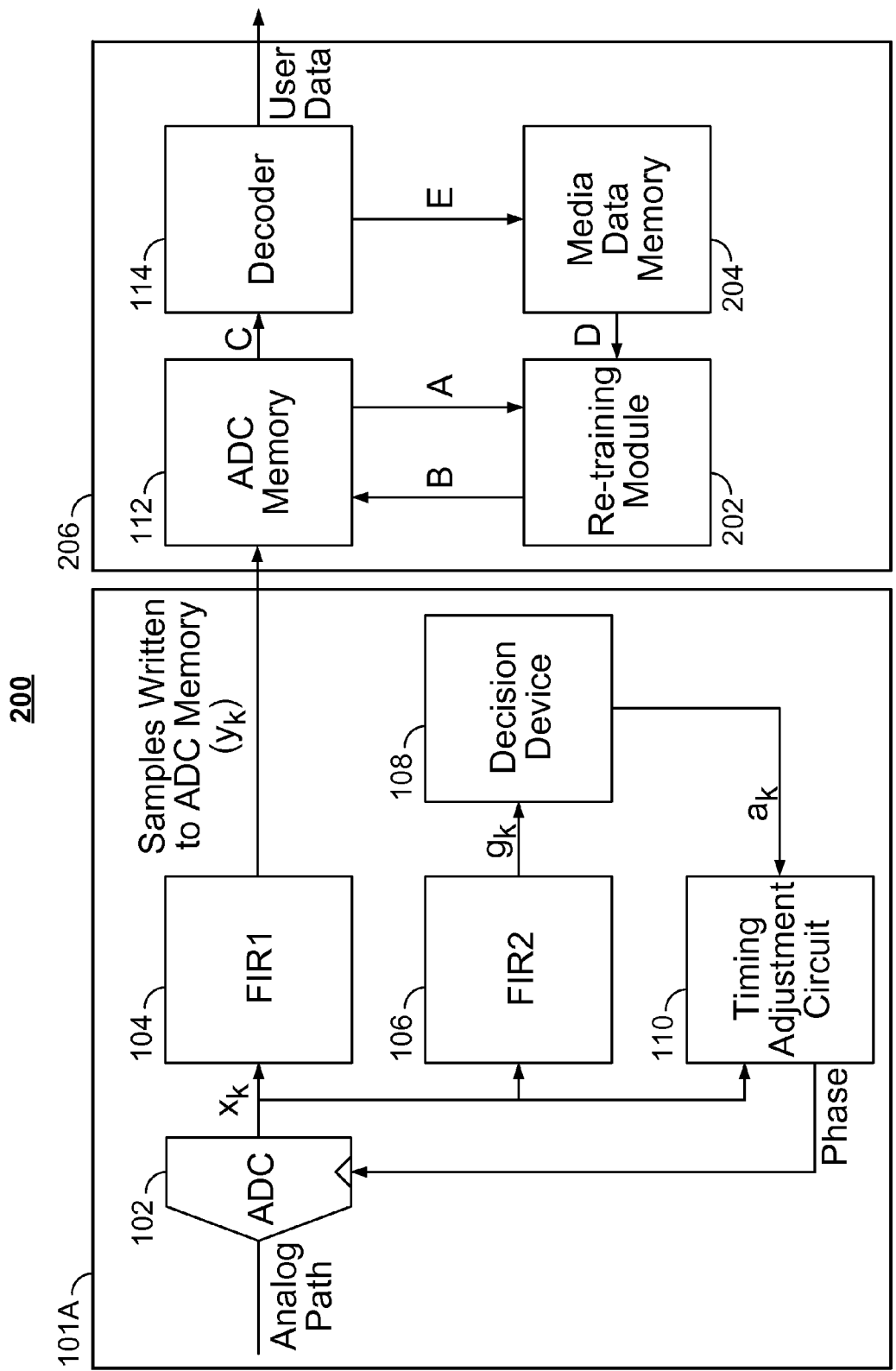
FIG. 2 is a block diagram illustrating an embodiment of a read channel 200.

FIG. 2 is a block diagram illustrating an embodiment of a read channel 200. In read channel 200, data sectors do not need to be re-read from the storage media to read channel 200 for re-running or re-training the various modules during the error recovery procedures, thus reducing the latency associated with the error recovery procedures in read channel 200. As shown in FIG. 2, instead of re-reading data from the storage media, previous samples that are stored in ADC memory 112 are retrieved and then sent to a re-training module 202 for re-training various modules of read channel 200.

Different modules or aspects of read channel 200 may be re-trained by re-training module 202, including timing recovery, equalization, and the like. In the present patent application, the re-training of equalization and the re-running of the timing loop of the read channel are selected as illustrative examples only. The techniques disclosed herein may apply to the re-training of other aspects or modules of the read channel as well; accordingly, the present application is not limited to the specific examples disclosed herein.

In some embodiments, re-training module 202 includes sub-modules for re-training the timing loop. For example, if decoder 114 fails to decode the user data due to timing issues, then the timing loop may be re-run based on the SOVA or LDPC decisions stored in a media data memory module 204. The SOVA or LDPC decisions, in general, have a lower bit error rate (BER) than the bit decisions, $a_k$, that are output by decision device 108 in read channel front end module 101A. As a result, the improved BER may aid in the re-sampling of the phase to produce lower phase-offset variance.

With continued reference to FIG. 2, the sub-module for re-training the timing loop may read the samples from ADC memory 112 (see arrow A), then re-run the timing loops based on the SOVA/LDPC decisions (e.g., 1 bit hard decisions from the SOVA or the LDPC decoder) stored in media data memory 204 (see arrow D). The modified samples are then written back to ADC memory 112 (see arrow B). With the modified samples in ADC memory 112, decoder 114 may decode the user data again based on the modified samples (see arrow C).

In some embodiments, re-training module 202 includes sub-modules for re-training the equalization of read channel 200. For example, if decoder 114 fails to decode the user data due to sub-optimal training of FIR1 filter 104, then FIR1 filter 104 may be re-trained with a different set of initial coefficients to equalize the samples to a different target. Similar to the re-training of the timing loop, FIR1 filter 104 may be re-trained based on the SOVA or LDPC decisions stored in media data memory module 204.

With continued reference to FIG. 2, the sub-module for re-training FIR1 filter 104 may read the samples from ADC memory 112 (see arrow A), then adapt the coefficients of FIR1 filter 104 based on the SOVA/LDPC decisions stored in media data memory 204 (see arrow D). The modified samples are then written back to ADC memory 112 (see arrow B). With the modified samples in ADC memory 112, decoder 114 may decode the user data again based on the modified samples (see arrow C).

Figure 3:
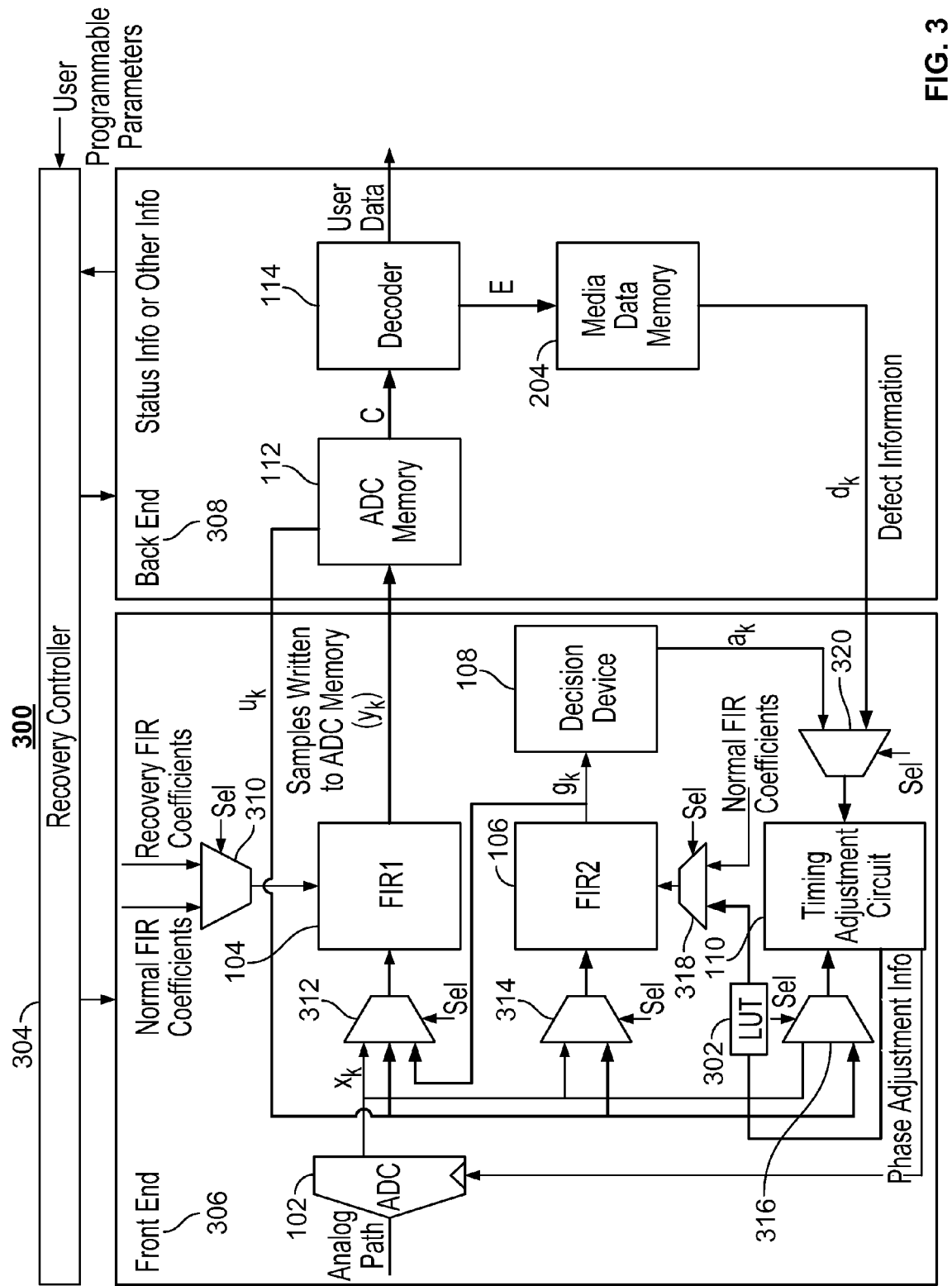
FIG. 3 is a block diagram illustrating an embodiment of a read channel 300.

FIG. 3 is a block diagram illustrating an embodiment of a read channel 300. Read channel 300 includes a front end module 306 and a back end module 308. Front end module 306 includes modules for equalization, timing recovery, and the like. Back end module 308 includes modules for maximum-likelihood (ML) detection, error-correcting code (ECC) decoding, and the like. Read channel 300 further includes a recovery controller 304 for controlling the error recovery processes. Recovery controller 304 is coupled to front end module 306 and back end module 308, respectively.

In some embodiments, recovery controller 304 receives user programmable parameters from a user. In some embodiments, recovery controller 304 receives status information, e.g., LDPC decoding status, or other information from back end module 308. For example, the status information or other information may be used by recovery controller 304 to determine whether to initiate, continue, repeat, or terminate any of the error recovery processes. Control signals or parameters can be passed from recovery controller 304 to front end module 306 and back end module 308 to control the signal flow and the error recovery processes.

Read channel 300 is similar to read channel 200 in that data sectors do not need to be re-read from the storage media to read channel 300 for re-running or re-training the various modules during the error recovery procedures, thus reducing the latency associated with the error recovery procedures in read channel 300. As will be described in greater detail below, instead of re-reading data from the storage media, previous samples that are stored in ADC memory 112 are retrieved and then used for re-training various modules of read channel 300.

Read channel 300 re-uses some of the existing hardware in front end module 306 for re-training the various modules during the error recovery procedures. For example, instead of using a separate module, such as re-training module 202 in FIG. 2, read channel 300 re-uses modules including FIR1 filter 104, FIR2 filter 106, and timing adjustment circuit 110 in front end module 306 during error recovery, thus reducing the amount of hardware and the cost of the system. Some of the existing hardware in front end module 306 may be re-used during error recovery because the front end module 306 of read channel 300 is idle during error recovery. In particular, the hard disk controller stops reading from the storage media disk and initiates the error recovery procedures for recovering the failed data sectors. As a result, some of the existing hardware can be re-used without affecting the regular data reading operations. The modules that are re-used during error recovery are switched between a normal mode and an error recovery mode (also referred to as a reprocessing mode) by multiplexing different sets of input into the modules, as will be described in greater detail below.

With continued reference to FIG. 3, when read channel 300 is operating in the normal mode, the hard disk magnetic signal is read by a read head and processed by an analog path. The analog signal from the analog path is then sampled by an analog-to-digital converter (ADC) 102, which converts the analog signal to a discrete time digital representation of the analog signal, $x_k$. Multiplexer 312 selects $x_k$ and forwards it to a FIR1 filter 104 as an input, while multiplexer 310 selects a set of normal mode FIR coefficients for initiating the coefficients of FIR1 filter 104. The ADC generated digital samples, $x_k$, are equalized by FIR1 filter 104, and the equalized output, $y_k$, is written into an ADC memory block 112.

During the normal mode, the ADC generated digital samples, $x_k$, are also fed into a second FIR filter, FIR2 filter 106. Multiplexer 314 selects $x_k$ and forwards it to FIR2 filter 106 as an input, while multiplexer 318 selects a set of normal mode FIR coefficients for initiating the coefficients of FIR2 filter 106. The equalized output, $g_k$, is fed to a decision device 108. Decision device 108 outputs bit decisions, $a_k$, which are fed into a timing adjustment circuit 110 by multiplexer 320. Timing adjustment circuit 110 takes the bit decisions, $a_k$, and the ADC generated digital samples, $x_k$, selected by multiplexer 316 as inputs and generates sampling phase adjustment information for adjusting the sampling phase at ADC 102. At the back end, ADC memory block 112 stores the equalized samples, $y_k$, from front end module 306, and these stored samples are further fed into decoder 114, which decodes the samples into user data. Decoder 114 also stores the SOVA or LDPC decisions into media data memory 204.

During the error recovery mode, both the equalization and the timing of read channel 300 may be re-trained. In this mode, FIR1 filter 104 no longer receives input samples from ADC 102. Instead, digital samples, $u_k$, are read from ADC memory 112 by configuring multiplexer 312 to select $u_k$ and forward the samples to FIR1 filter 104 as an input. During the error recovery mode, FIR1 filter 104 may be initialized with a set of FIR coefficients that is different from the set of FIR coefficients used during the normal mode. For example, multiplexer 310 may be configured to select a different set of FIR coefficients and forward the set of coefficients to FIR1 filter 104 as another input. FIR1 filter 104 may adapt its coefficients using different criteria, and the equalized samples from FIR1 filter 104, $y_k$, are then written back to ADC memory 112. With the modified samples stored in ADC memory 112, decoder 114 may decode the user data again based on the modified samples.

In some embodiments, the different sets of initial FIR coefficients for FIR 1 filter 104 may be determined empirically. For example, a pseudorandom binary sequence (PRBS) may be read from the disk and the filter coefficients adapted to minimize the BER. By stressing the storage media under different extreme temperatures, for example, different initial FIR recovery coefficients that can be used during error recovery can be obtained.

During the error recovery mode, timing adjustment circuit 110 no longer receives input samples from ADC 102. Instead, digital samples, $u_k$, are read from ADC memory 112 by configuring multiplexer 316 to select $u_k$ and forward the samples to timing adjustment circuit 110 as an input. In addition, timing adjustment circuit 110 no longer receives bit decisions from decision device 108. Instead, bit decisions from back end module 308 are fed as input into timing adjustment circuit 110 by multiplexer 320. In some embodiments, the bit decisions from back end module 308 may be SOVA decisions or LDPC decisions. Timing adjustment circuit 110 may compare $u_k$ and the bit decisions in order to determine the phase adjustment information for timing recovery purposes. Because there is a delay associated with the bit decisions (e.g., the LDPC decisions), timing adjustment circuit 110 is configured to match the correct samples from $u_k$ with their corresponding bit decisions before comparisons of the two can be made to determine the phase adjustment information.

With continued reference to FIG. 3, the phase adjustment information output by timing adjustment circuit 110 is used as an input to a lookup table 302, which returns a set of coefficients for FIR2 filter 106 that can help with re-equalizing the signal and adjusting the timing of the signal. During error recovery, FIR2 filter 106 no longer receives input samples from ADC 102. Instead, digital samples, $u_k$, are read from ADC memory 112 by configuring multiplexer 314 to select $u_k$ and forward the samples to FIR2 filter 106 as an input. The timing-adjusted output, $g_k$, is then fed as an input to FIR1 filter 104 to be equalized to the target signal that SOVA expects.

In some embodiments, defect information (e.g., defect locations and defect lengths) may be sent from back end module 308 to front end module 306. The defect information may be used to aid with timing adjustment during error recovery. In some embodiments, phase adjustment may be disabled when a defect is detected.

In some embodiments, the re-training or re-running of the various modules may be repeated using different sets of coefficients until decoder 114 is able to decode the previously undecodable user data. In some embodiments, the error recovery procedures may be terminated after a user-programmable time-out counter has expired.

In some embodiments, test vectors may be stored into ADC memory 112 and the test vectors may be read as input into FIR1 filter 104 for running functional tests or other debugging procedures.

In some embodiments, re-training or re-running of modules other than equalization or timing may be performed on read channel 300 during error recovery. In some embodiments, different feedback loops may be re-run using the samples read from ADC memory 112. The feedback loops may be used to adjust different gains, offsets, and MR-asymmetries, and the like. In some embodiments, different detectors may be re-run. For example, the maximum likelihood detector or the decision feedback detectors may be re-run using the samples read from ADC memory 112.

Figure 4:
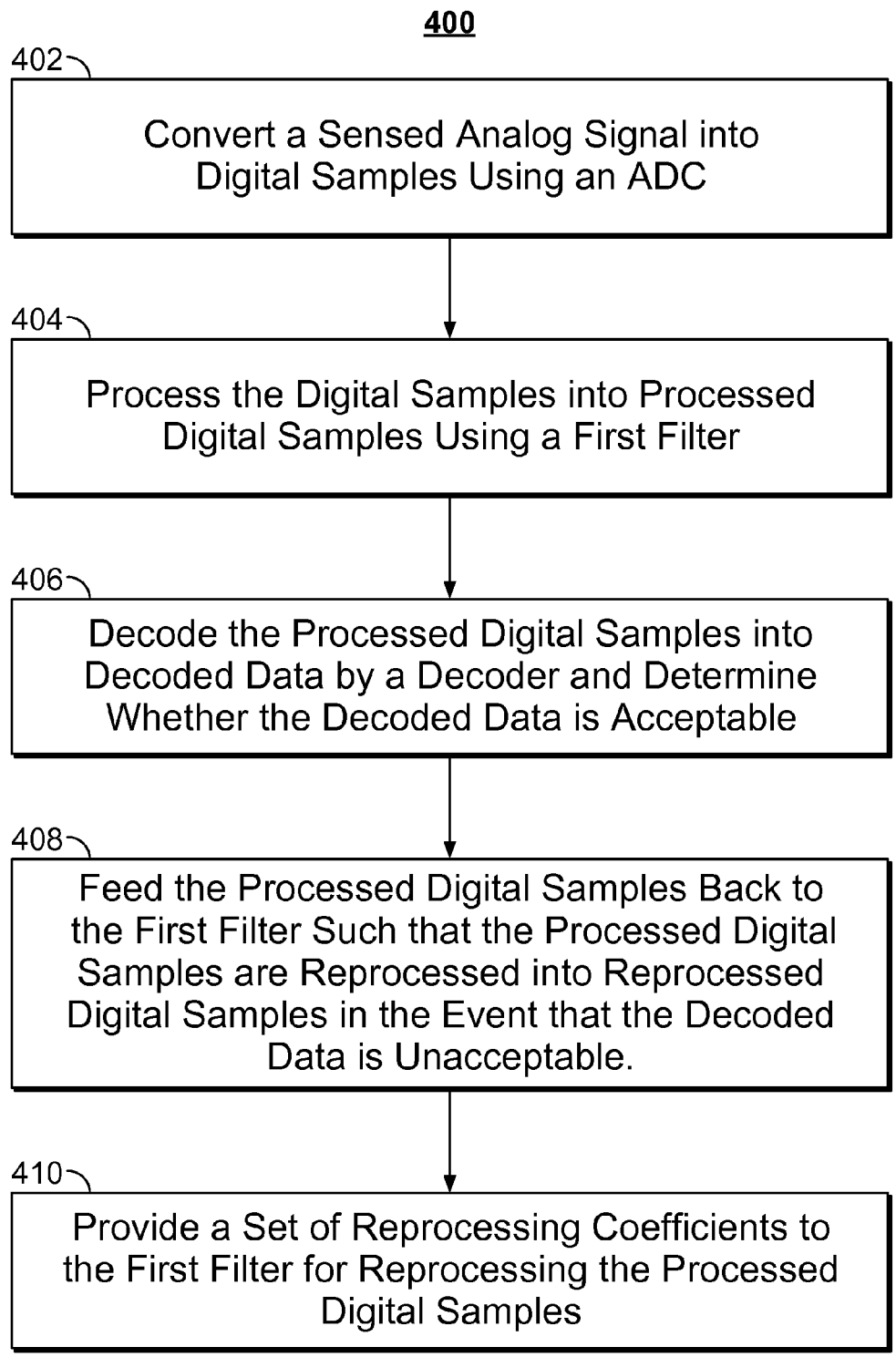
FIG. 4 is a flow chart illustrating an embodiment of a process 400 for recovering data.

FIG. 4 is a flow chart illustrating an embodiment of a process 400 for recovering data. In some embodiments, process 400 is a process performed by read channel 300 in FIG. 3. At 402, a sensed analog signal is converted into digital samples by an analog-to-digital converter (ADC). At 404, the digital samples are processed by a first filter into processed digital samples. The first filter may be an FIR filter equalizing the digital samples. The processed digital samples may be stored in a storage, e.g., ADC memory 112 in FIG. 3. At 406, the processed digital samples are decoded into decoded data by a decoder, and it is determined whether the decoded data is acceptable. For example, the decoder may include a SOVA module and an LDPC decoder. In some embodiments, the decoded data is unacceptable when the LDPC decoder fails to decode the processed digital samples into decoded data. At 408, a reprocessing circuit is used to feed the processed digital samples back to the first filter such that the processed digital samples are reprocessed into reprocessed digital samples in the event that the decoded data is unacceptable. At 410, a set of reprocessing coefficients is provided to the first filter for reprocessing the processed digital samples.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A data recovery system, comprising:
an analog-to-digital converter (ADC) converting a sensed analog signal into digital samples;
a first filter processing the digital samples into processed digital samples;
a decoder decoding the processed digital samples into decoded data and determining whether the decoded data is acceptable;
a reprocessing circuit feeding the processed digital samples back to the first filter to be reprocessed into reprocessed digital samples in the event that the decoded data is unacceptable; and
a memory providing a set of reprocessing coefficients for the first filter to reprocess the processed digital samples.

2. The data recovery system of claim 1, wherein the processed digital samples are stored in a storage, and wherein feeding the processed digital samples back to the first filter comprises retrieving the processed digital samples from the storage and feeding the retrieved samples back to the first filter to be reprocessed.

3. The data recovery system of claim 1, wherein the reprocessed digital samples are decoded by the decoder into reprocessed decoded data.

4. The data recovery system of claim 1, wherein the processing of the digital samples by the first filter is performed during a normal mode, and wherein the reprocessing of the processed digital samples by the first filter is performed during a reprocessing mode.

5. The data recovery system of claim 4, wherein the data recovery system is configured to run in the normal mode or the reprocessing mode, but not concurrently, and wherein a same piece of hardware corresponding to the first filter is used in the normal mode and the reprocessing mode.

6. The data recovery system of claim 4, wherein the sensed analog signal is received from a storage media during the normal mode but not during the reprocessing mode.

7. The data recovery system of claim 1, further comprising a multiplexer configured to select the digital samples and forward the digital samples to the first filter as an input during a normal mode and further configured to select the processed digital samples that is feedback by the reprocessing circuit and forward the processed digital samples to the first filter as an input during a reprocessing mode.

8. The data recovery system of claim 1, wherein the first filter comprises a finite impulse response (FIR) filter, and wherein processing the digital samples comprises equalizing the digital samples.

9. The data recovery system of claim 1, further comprising a timing adjustment circuit adjusting sample phases of the ADC at least in part based on the digital samples during a normal mode, and wherein the reprocessing circuit is further configured to feed the processed digital samples back to the timing adjustment circuit as an input during a reprocessing mode and in the event that the decoded data is unacceptable, and wherein the timing adjustment circuit determines during the reprocessing mode phase adjustment information for adjusting the timing is phase of the reprocessed digital samples based at least in part on the processed digital samples.

10. The data recovery system of claim 9, wherein the decoder comprises an error-correcting code (ECC) decoder, and wherein the timing adjustment circuit determines during the reprocessing mode phase adjustment information for adjusting the timing phase of the reprocessed digital samples based at least in part on bit decisions output by the ECC decoder.

11. The data recovery system of claim 9, wherein the decoder comprises a soft output Viterbi algorithm (SOVA) module, and wherein the timing adjustment circuit determines during the reprocessing mode phase adjustment information for adjusting the timing phase of the reprocessed digital samples based at least in part on bit decisions output by the SOVA module.

12. The data recovery system of claim 9, further comprising a second filter processing the digital samples during the normal mode, and wherein the reprocessing circuit is further configured to feed the processed digital samples back to the second filter as an input during the reprocessing mode and in the event that the decoded data is unacceptable, and wherein the phase adjustment information determined by the timing adjustment circuit is used to lookup a lookup table for a set of coefficients for the second filter, and wherein the output of the second filter is fed as an input to the first filter for adjusting the timing of the reprocessed digital samples during the reprocessing mode.

13. A method for recovering data, comprising:
converting a sensed analog signal into digital samples using an analog-to-digital converter (ADC);
processing the digital samples into processed digital samples using a first filter;
decoding the processed digital samples into decoded data and determining whether the decoded data is acceptable;
feeding the processed digital samples back to the first filter using a reprocessing circuit such that the processed digital samples are reprocessed into reprocessed digital samples in the event that the decoded data is unacceptable; and
providing a set of reprocessing coefficients for the first filter to reprocess the processed digital samples.

14. The method of claim 13, further comprising storing the processing digital samples in a storage, and wherein feeding the processed digital samples back to the first filter comprises retrieving the processed digital samples from the storage and feeding the retrieved samples back to the first filter to be reprocessed.

15. The method of claim 13, further comprising decoding the reprocessed digital samples into reprocessed decoded data using the decoder.

16. The method of claim 13, wherein the processing of the digital samples using the first filter is performed during a normal mode, and wherein the reprocessing of the processed digital samples using the first filter is performed during a reprocessing mode.

17. The method of claim 16, wherein the normal mode and the reprocessing mode are not run concurrently, and wherein a same piece of hardware corresponding to the first filter is used in the normal mode and the reprocessing mode.

18. The method of claim 16, further comprising reading from a storage media to obtain the sensed analog signal during the normal mode but not during the reprocessing mode.

19. The method of claim 13, further comprising configuring a multiplexer to select the digital samples and forward the digital samples to the first filter as an input during a normal mode, and further comprising configuring the multiplexer to select the processed digital samples that is feedback by the reprocessing circuit and forward the processed digital samples to the first filter as an input during a reprocessing mode.

20. The method of claim 13, wherein the first filter comprises a finite impulse response (FIR) filter, and wherein processing the digital samples comprises equalizing the digital samples.

* * * * *